2 Sheets--Sheet 1.

C. O. LUCE.
Horse Hay-Rakes.

No. 146,349. Patented Jan. 13, 1874.

WITNESSES:
Jas. L. Ewin
Walter Allen

INVENTOR:
Curtis Orange Luce
By Knight Bro. Attorneys.

AM. PHOTO-LITHOGRAPHIC Co. N.Y. (OSBORNE'S PROCESS)

2 Sheets--Sheet 2.

C. O. LUCE.
Horse Hay-Rakes.

No. 146,349. Patented Jan. 13, 1874.

WITNESSES:
Jas. L. Ewin
Walter Allen

INVENTOR:
Curtis Orange Luce
By Knight Bro. Attorneys.

UNITED STATES PATENT OFFICE.

CURTIS ORANGE LUCE, OF BRANDON, VERMONT.

IMPROVEMENT IN HORSE HAY-RAKES.

Specification forming part of Letters Patent No. 146,349, dated January 13, 1874; application filed May 17, 1873.

*To all whom it may concern:*

Be it known that I, CURTIS ORANGE LUCE, of Brandon, in the county of Rutland and State of Vermont, have invented a certain Horse Hay-Rake, of which the following is a specification:

This invention relates to the class of horse hay-rakes in which rake-teeth, adapted to be elevated and depressed at will, are arranged between the wheels of a sulky-frame; and it relates particularly to that form of this class of horse-rakes in which the teeth are pivoted independently, and raised and lowered by means of a union-bar with vertical slots, through which the teeth work.

This invention consists, primarily, in holding the rake-teeth to their work, as also raising and lowering them by means of friction derived from a rotary axle through a suitable clutch and transmitting medium. The invention further consists in means for shifting the clutch by the feet.

Figure 1:
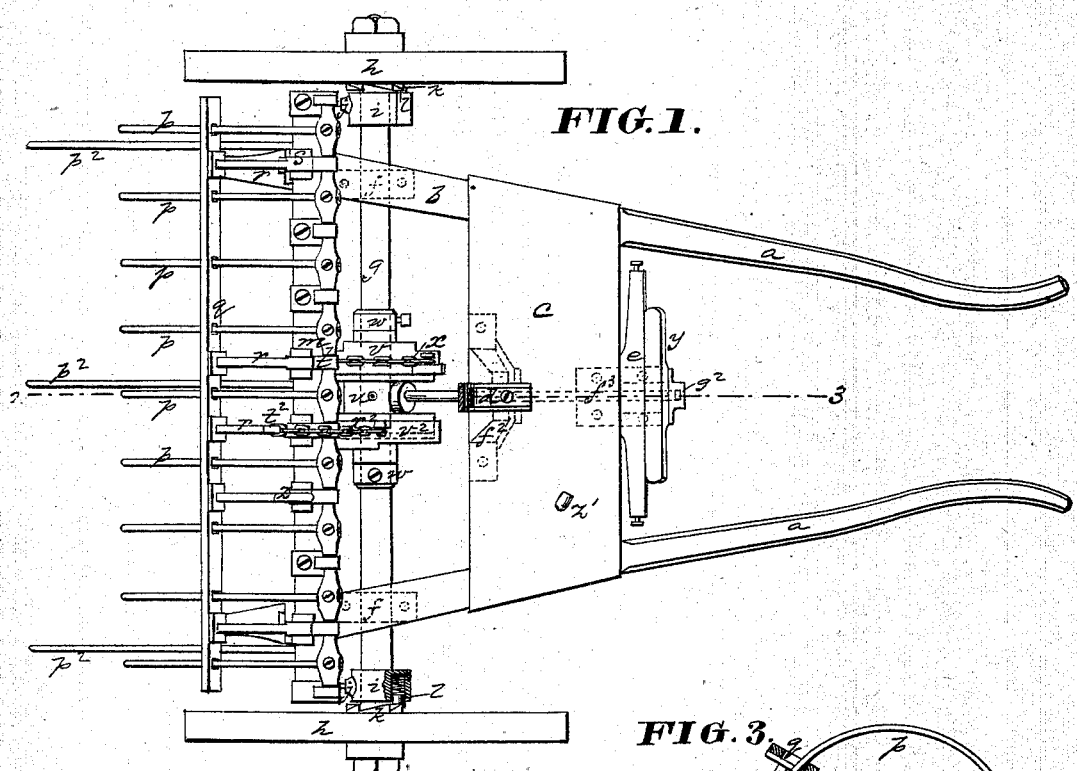
Figure 3:
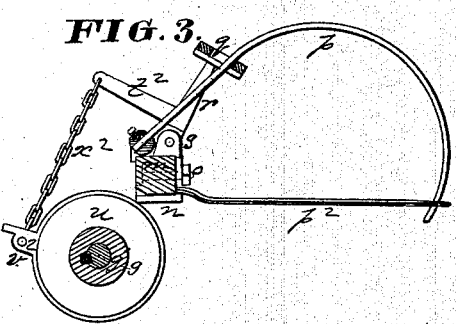
Figure 2:
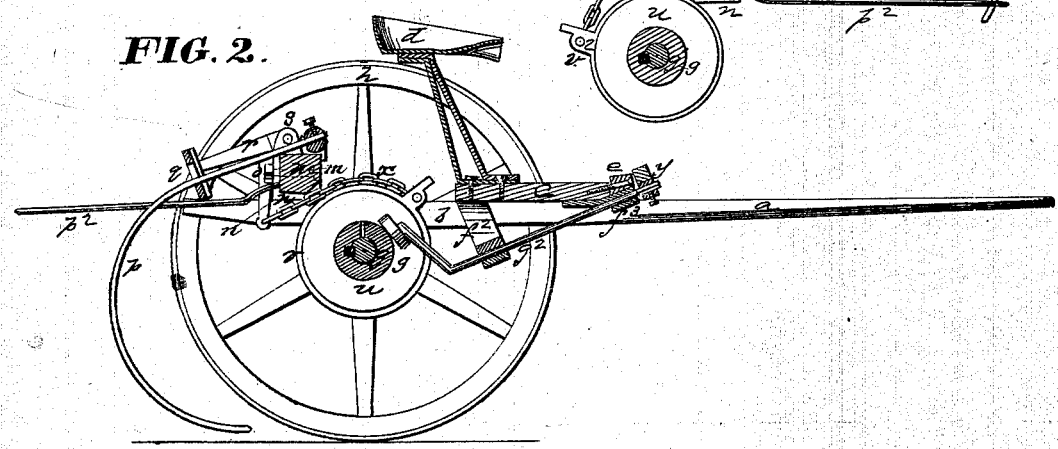
Figure 4:
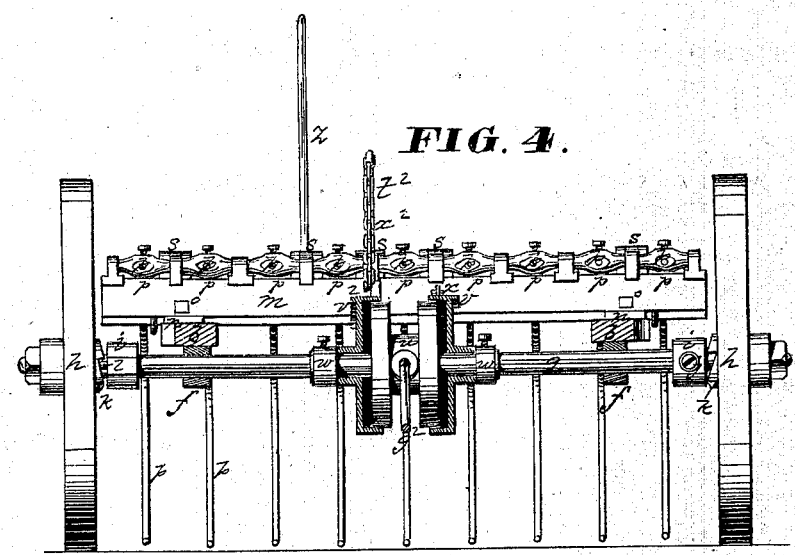
Figure 5:
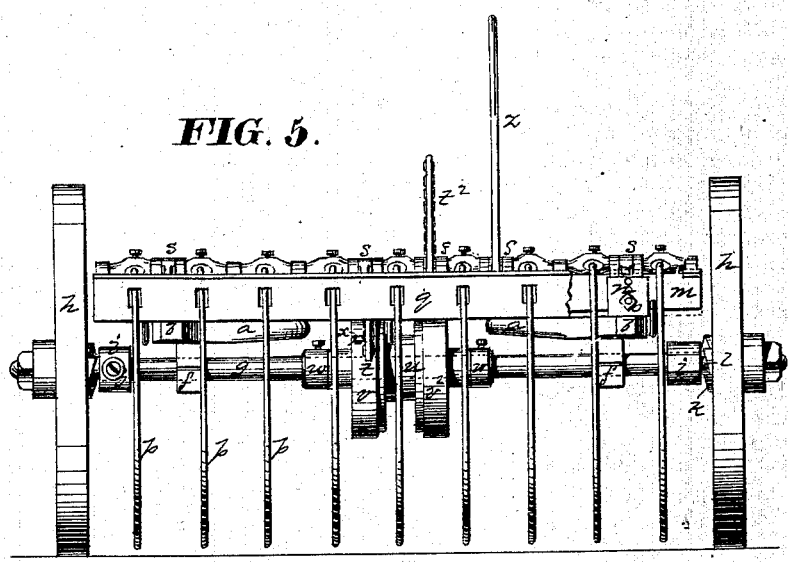
Figure 6:
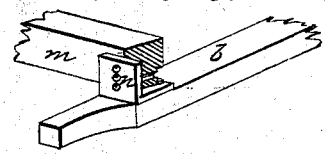

Figure 1 is a plan view, partly in section, of a horse hay-rake illustrating this invention. Fig. 2 is a vertical longitudinal section on the line 2 3, Fig. 1. Fig. 3 is a partial longitudinal section in the same plane, looking in the opposite direction. Fig. 4 is a front elevation, partly in vertical section, in the plane of the axle. Fig. 5 is a rear elevation. Fig. 6 is a sectional perspective view, illustrating a detail.

Referring to the drawings, $a\,a$ represent a pair of thills; $b\,b$, rearward extensions of the same; $c$, a foot-board or platform at the rear extremity of the thills proper, and supported thereon; $d$, a driver's seat mounted on this platform; and $e$, a draft-bar attached to the front edge of the same. $f\,f$ represent journal-boxes attached to the under side of the thill-extensions $b$ for the reception of a rotary axle, $g$. $h\,h$ represent ground-wheels mounted loosely on the ends of the axle $g$. $i\,i$ represent collars secured on the axle by clamp-screws $j$; and $k\,l$ represent ratchets on the inner ends of the hubs, and spring-supported pawls or bolts in the collars $i$, to couple the ground-wheels to the axle, so as to permit their independent movement, as in turning, and to disconnect them when backing. $m$ represents a transverse rail, supported on the rear end of the thill-extensions $b$, through the medium of metallic brackets $n$, with vertical series of perforations for adjusting the rail by means of its attaching-bolts $o$, as to height, as illustrated in Fig. 6. $p\,p$ represent rake-teeth separately hinged to the rail $m$, and $q$ represents a union-bar with vertical slots, through which the teeth work. $p^2\,p^2$ represent clearing-fingers; $r\,r$ represent links; and $s\,s$, hinge-brackets attaching the union-bar $q$ to the rail $m$. $t\,t^2$ represent lever-arms projecting upward and downward, respectively, from a central pair of the links $r$. $u$ represents a large circumferentially-grooved collar mounted centrally on the axle $g$, and attached thereto by a spline. $v\,v^2$ represent a pair of disks mounted loosely on the axle between this collar and a pair of tight collars, $w$, and provided with flanges to embrace the circular ends of the collar $u$, so as to be yieldingly attached to the latter by friction. $x\,x^2$ represent chains attaching the lever-arms $t\,t^2$, respectively, to the peripheries of the disks $v\,v^2$. $f^2\,f^3$ represent journal-box brackets attached to the under side of the platform $c$; and $g^2$, a rock-shaft mounted therein, and terminating at its rear end in a friction-roller at the extremity of an upwardly-turned arm within the groove of the clutch-collar $u$. $y$ represents a treadle applied to the squared front end of the rock-shaft $g^2$. $z$ represents a hand-lever projecting from one of the links $r$, and $z'$ represents a catch on the platform $c$ to engage therewith to retain the rake-teeth in elevated position.

The head-rail $m$ may be vertically adjustable, as described, or the provision for adjustment may be omitted, as preferred.

The machine, as described, admits of various other modifications, in details unessential to the respective features hereinafter claimed. These it is not necessary to specify. The improvements are also applicable to rakes adapted to be drawn by a double team.

In running to and from the field the rake-teeth are retained in elevated position by the catch $z'$ engaging with the hand-lever $z$, and the clutch-collar $u$ rests or is held in central position, so as to disengage both the disks $v\,v^2$ from the axle $g$, which rotates with the ground-wheels $h$ and carries the clutch-collar. The rake is prepared for action by releasing the hand-lever and lowering the rake-teeth. The driver now places his feet on the respective ends of the treadle $y$ and starts his team. Pressure being applied by the left foot, the clutch-collar $u$ is held in frictional mesh with the disk $v$, and through this and the chain $x$, lever-arm $t$, links $r$, and union-bar $q$, the rake-teeth are held to their work while gathering. Pressure being applied by the right foot, the clutch-collar is disengaged from the disk $v$ and thrown into mesh with $v^2$, by which, through the chain $x^2$, lever-arm $t^2$, links $r$, and union-bar $q$, the rake-teeth are lifted to discharge their load, and may thus be temporarily held in elevated position, as while turning. They are instantly returned to working position at will, the machine being in motion, by reversing the pressure on the treadle. The rake-teeth are thus raised and lowered from a rotary axle by frictional connection therewith under control of the driver's feet, leaving his hands free. The parts of the friction-clutch slip on each other with sufficient resistance, determined by the pressure applied to the clutch-collar by the operator. In backing, the hand-lever may be called into use for lifting the teeth to clear stumps or other obstructions. The common ratchet-connection between the ground-wheels and rotary axle permits the independent movement of the wheels, as in turning, and allows the axle to remain at rest while backing.

The following is claimed as new, namely:

1. In a horse hay-rake, the combination of a rotary axle and a clutch thereon, comprising a pair of disks with oppositely-arranged connections $x\ t\ x^2\ t^2$, operating substantially as herein described, as means for raising and lowering the rake-teeth and holding them to their work by friction, as set forth.

2. In a horse hay-rake, the combination of a rotary axle, a clutch comprising a pair of disks with oppositely-arranged connections $x\ t\ x^2\ t^2$, for raising and lowering the rake-teeth and holding them to their work by friction, and a treadle for shifting and holding the clutch-slide by the feet, as set forth.

3. The union-bar $q$, with its links $r$ and lever-arms $t\ t^2$, in combination with the clutch-disks $v\ v^2$ and chains $x\ x^2$, constructed and arranged as described, for operating separately-pivoted rake-teeth by friction, in the manner herein specified.

CURTIS O. LUCE.

Witnesses:
 GEO. BRIGGS,
 E. J. ORMSBEE.